United States Patent [19]
Wiest et al.

[11] 3,954,687
[45] May 4, 1976

[54] STABLE POLYVINYL ESTER DISPERSIONS AND METHODS OF PRODUCING THE SAME

[75] Inventors: Hubert Wiest; Wilhelm Lechner, both of Burghausen, Germany

[73] Assignee: Wacker Chemie GmbH, Munich, Germany

[22] Filed: Oct. 2, 1974

[21] Appl. No.: 511,248

[30] Foreign Application Priority Data
Oct. 4, 1973  Germany............................ 2349925

[52] U.S. Cl. ........................ 260/17 A; 260/17.4 ST
[51] Int. Cl.² ........................................... C08L 3/02
[58] Field of Search ................... 260/17.4 ST, 17 A

[56] References Cited
UNITED STATES PATENTS

| | | | |
|---|---|---|---|
| 2,508,341 | 5/1950 | Wilson | 260/17 |
| 3,769,248 | 10/1973 | Kovats | 260/17.4 St |
| 3,817,896 | 6/1974 | Bergmeister | 260/17.4 ST |

FOREIGN PATENTS OR APPLICATIONS
649,512  10/1962  Canada............................ 260/17.4

OTHER PUBLICATIONS

Chem. Absts. Vol. 76 (1972): 87267h, Viscosity Stabilization . . . Ethers, Davis.

*Primary Examiner*—Howard E. Schain
*Assistant Examiner*—Edward Woodberry
*Attorney, Agent, or Firm*—Hammond & Littell

[57] ABSTRACT

An improvement in the production of polyvinyl ester dispersions by polymerization of vinyl esters or copolymerization of vinyl esters with up to 40% by weight of oil-soluble, mono-olefinically-unsaturated monomers in an aqueous emulsion in the presence of water-soluble radical-forming polymerization catalysts, protective colloids and optionally emulsifiers and polymerization aids, the improvement comprising using carboxymethyl celluloses having a substitution degree of at least 10 as said protective colloids; as well as stable mixtures of the said polyvinyl ester dispersions and dextrin.

7 Claims, No Drawings

STABLE POLYVINYL ESTER DISPERSIONS AND METHODS OF PRODUCING THE SAME

THE PRIOR ART

The production of stable dispersions through the polymerization or copolymerization of vinyl esters under appropriate conditions in an aqueous emulsion, is well known. For many purposes it is essential, however, that the dispersions be stable not only as such, but also after the admixture of, for example, fillers, other polymers or natural substances. Already in the production of the dispersion, therefore, provisions must be made by the selection of the proper polymerization aids, such as protective colloids, emulsifiers, regulators and catalysts, or by the copolymerizing of copolymers, that the resulting dispersions will be suitable for the planned use.

Polyvinyl ester dispersions are often used for the production or improvement of adhesives. A special problem here is the polyvinyl ester-dextrin adhesives. It is known in principle that the adhesive properties of dextrin adhesives can be improved by addition of polyvinyl acetate dispersions. The known dispersions, however, are either incompatible or only little compatible with dextrin. The resulting mixes are often not usable because of coagulate or speck formation. In other cases, an early de-emulsification with phase separation occurs. In particular, in the low-viscosity dextrin types, of special interest for adhesives, a phase separation takes place within hours. Due to this incompatibility, such mixes can be used only for a short time, and the improvements attainable therewith over pure dextrin adhesives are slight.

OBJECTS OF THE INVENTION

An object of the present invention is to develop a method of production of polyvinyl ester dispersions which are stable coagulate-free dispersions from which stable coagulate-free dextrin-polymer dispersion mixes can be produced.

Another object of the present invention is the development of an improvement in the production of polyvinyl ester dispersions by polymerization or copolymerization of vinyl esters alone or with up to 40% by weight of the monomer mixture of monomers copolymerizable with vinyl esters in an aqueous emulsion in the presence of water-soluble free-radical-forming polymerization catalysts, protective colloids and optionally emulsifiers and polymerization aids, the said improvement comprising using carboxymethyl cellulose having a substitution degree of at least 10, as said protective colloids.

A further object of the present invention is the obtention of the stable, coagulate-free polyvinyl ester dispersion produced by the above process.

A still further object of the present invention is the development of stable aqueous dextrin-polyvinyl ester mixes containing from 20 to 80% by weight of a solids content consisting essentially of
a. 10 to 90 parts by weight of dextrin, and
b. 10 to 90 parts by weight of polyvinyl esters produced by emulsion polymerization in the presence of carboxymethyl celluloses having a substitution degree of at least 10, and
from 20% to 80% by weight of water.

These and other objects of the invention will become more apparent as the description thereof proceeds.

DESCRIPTION OF THE INVENTION

The subject of the invention is a method for the production of polyvinyl ester dispersions by polymerization of vinyl esters or copolymerization of vinyl esters with up to 40% by weight of oil-soluble, mono-olefinically-unsaturated monomers in an aqueous emulsion in the presence of water-soluble free-radical-forming polymerization catalysts, protective colloids and, optionally, emulsifiers and other polymerization aids, characterized in that carboxymethyl celluloses having a substitution degree of at least 10, are used as said protective colloids.

Carboxymethyl celluloses have not heretofore been used in the practice for the production of polyvinyl ester dispersions, since stable and coagulate-free dispersions could not be obtained. It is now found, surprisingly, that with the use of carboxymethyl cellulose having a substitution degree of over 10, stable coagulate-free and agglomerate-free dispersions can nevertheless be produced. At lower degrees of substitution of the carboxymethyl cellulose stable dispersions are no longer obtained. Further, it was unexpectedly found that with the dispersions according to the invention and dextrin, stable non-separating adhesive mixtures can be produced.

More particularly, therefore, the present invention relates to, in the production of stable polyvinyl ester dispersions, comprising dispersing a monomer charge of vinyl esters of alkanoic acids having from 1 to 18 carbon atoms and up to 40% by weight of said monomer charge, of oil-soluble, mono-olefinically-unsaturated monomers copolymerizable with said vinyl esters, in an aqueous emulsion in the presence of water-soluble free-radical-forming polymerization catalysts and protective colloids, polymerizing said monomer charge dispersion at a temperature between 0° and 100°C and recovering said polyvinyl ester dispersion, the improvement consisting of employing from 1 to 10% by weight, based on the weight of said monomer charge, of carboxymethyl celluloses having a substitution degree of at least 10, as said protective colloids.

In addition, the present invention relates to the polyvinyl ester dispersion so produced and to a stable aqueous dextrin-polyvinyl ester adhesive mix containing from 20% to 80% of a solids content consisting essentially of
a. from 10 to 90 parts by weight of dextrin, and
b. from 10 to 90 parts by weight of polyvinyl esters produced by emulsion polymerization in the presence of carboxymethyl celluloses having a substitution degree of at least 10, and
from 20 to 80% by weight of water.

The carboxymethyl celluloses used according to the invention must, for the reasons stated above, have a substitution degree of at least 10. Generally, it is not greater than 20, and preferably it is between 12 and 18. The substitution degree is the average number of carboxymethyl groups per 10 glucose building blocks of the cellulose.

The molecular weight of the carboxymethyl cellulose may vary within wide limits. Normally, types having a degree of polymerization of 100 to 10,000 enter into consideration. The quantities used are usually from 1 to 10% by weight, preferably 2 to 6%, by weight, based on the weight of the monomer charge. Generally the salts of carboxymethyl cellulose, in particular the wear-soluble salts, are employed. Preferably the sodium salt is utilized.

The polymerization is carried out under the conditions normal for the emulsification polymerization of vinyl esters. The temperature is usually between 0°C and 100°C, preferably 40° and 100°C.

In addition to the protective colloid, carboxymethyl cellulose, anionic and/or non-ionic emulsifiers can also be used. Examples of anionic emulsifiers or anionic surface-active compounds which are optionally charged in quantities of 0.05 to 3% by weight, based on the weight of the monomer charge, either singly or in mixture, are for example alkyl sulfonates, alkylaryl sulfonates, alkyl sulfates, sulfates of hydroxyalkanoic acids, alkyl and alkylaryl disulfonates, sulfonated fatty acids, sulfates and phosphates of alkyl and alkylaryl polyethoxy alcohols, as well as dialkyl sulfosuccinates, all containing hydrocarbon chains of 8 to 22 carbon atoms. Suitable non-ionic emulsifiers or non-ionic surface-active compounds are, for example, the addition products of 5 to 50 mols of ethylene oxide and/or propylene oxide to (1) straight or branched-chain alkanols with 6 to 22 carbon atoms, (2) alkylphenols having from 8 to 18 carbon atoms in the alkyl, (3) higher fatty acids, (4) higher fatty acid amides, and (5) primary and secondary amines having 1 or 2 alkyls with from 8 to 24 carbon atoms; as well as block polymers of ethylene oxide and/or propylene oxide. These nonionic emulsifiers can be used additionally singly or in mixtures in quantities of from 0.3 to 6% by weight, based on the weight of the monomer charge.

The polymerization catalysts utilized are catalysts commonly employed in emulsion polymerization of vinyl esters and which are water-soluble and form free radicals. Examples of such water-soluble, free-radical-forming polymerization catalysts are hydrogen peroxide, sodium, potassium and ammonium persulfate, as well as teritiary butyl hydroperoxide. They may be employed alone or together with reducing agents such as sodium formaldehyde sulfoxylate, iron-II salts, sodium dithionite, sodium hydrogen sulfite, sodium sulfite, sodium thiosulfate and precious metal sol/hydrogen, as a redox catalyst system. The free-radical formers and possibly the reducing agents, which are used in the usual quantities, preferably 0.01 to 2% by weight, based on the total weight of the monomer, may be charged in the aqueous emulsifier solution or be proportioned in during the polymerization.

In the polymerization, the usual polymerization aids may also be added, such as buffer salts, for example alkali metal acetates, alkali metal carbonates, alkali metal phosphates, as well as molecular weight regulators such as mercaptans, aldehydes, particularly alkanols having from 4 to 8 carbon atoms, chloroform, methylene chloride and trichloroethylene.

The water-monomer ratio is not critical. Generally, water makes up about 40 to 80% by weight of the emulsion. Preferably, the proportions are selected so that dispersions with a solids content of 40 to 60% by weight are formed.

Chiefly, those vinyl esters whose carboxylic acids have a chain length of 1 to 18, preferably 4 to 20 carbon atoms, are used. In particular, vinyl esters of alkanoic acids having from 1 to 18 carbon atoms, preferably 2 to 4 carbon atoms, are used. Preferably, the vinyl ester employed is vinyl acetate. Examples of the vinyl esters are vinyl acetate, vinyl propionate, vinyl butyrate, vinyl hexanoate, vinyl 2-ethylhexanoate, vinyl isononanoate, vinyl laurate, and vinyl "Versatate". Versatate is derived from "Versatic" acids which are synthetically produced branched chain alkanoic acids having from 8 to 18 carbon atoms and an α-branched chain. They can be used singly or in admixture.

Examples of oil-soluble mono-olefinically-unsaturated monomers copolymerizable with the vinyl esters are $\alpha,\beta$-unsaturated mono- or di-carboxylic acid esters with an acid carbon chain of usually 3 to 5, and with alkanols having 1 to 12 carbon atoms, for example, methyl, ethyl, propyl, butyl, and 2-ethyl-hexyl esters of acrylic or methacrylic acid; maleic acid, fumaric acid and itaconic acid mono- and di-esters of the same alcohols; olefins, particularly those having 2 to 5 carbon atoms, such as ethylene and propylene; styrene; vinyl halides, for example vinyl fluoride, vinyl chloride, vinylidene chloride; and acrylonitrile.

Futhermore, it is advantageous in some cases to polymerize with a monomer charge containing additionally from 0.1 to 5% by weight, based on the weight of the monomers, of water-soluble mono-olefinically-unsaturated monomers and/or poly-olefinically-unsatuated monomers. Among these watersoluble, mono-olefinically-unsaturated monomers are mainly $\alpha,\beta$-olefinically-unsaturated mono- and/or di-carboxylic acids containing preferably 3 to 5 carbon atoms, such as acrylic acid, methacrylic acid, crotonic acid, maleic acid, fumaric acid and itaconic acid; their possibly lower alkyl or lower alkylol substituted amides such as acrylamide, N-methylolacrylamide; vinyl pyrrolidone and salts of vinyl sulfonic acid. Examples of poly-olefinically-unsaturated monomers copolymerizable with vinyl esters are allyl acrylate, vinyl crotonate, triallyl cyanurate and divinyl adipate. These polyunsaturated monomers permit cross-linkage of the polymerizate.

The dispersions of the invention are used mainly for the production of adhesive mixes with dextrin. Another subject of the invention is, therefore, the stable aqueous dextrin-polyvinylester mixes containing from 20 to 80% by weight of solids consisting essentially of a. 10 to 90 parts by weight of dextrin, and
b. 10 to 90 parts by weight of the polyvinyl esters which had been prepared by emulsion polymerization in the presence of carboxymethyl cellulose having a substitution degree of at least 10, and
20% to 80% by weight of water.

The adhesive mixes are generally prepared by simply mixing together the polyvinyl ester dispersion with the dextrin, possibly while heating to 90°C or by mixing the polyvinyl ester dispersion with an aqueous dextrin solution. Also, the addition of water for dilution is possible. In some cases also mixes may be prepared from polyvinyl ester powder, dextrin and water. The polyvinyl ester powder may be prepared by spray of freeze drying the dispersions according to the invention.

The polyvinyl ester dispersions also include the polyvinyl esters formed by co-polymerization with other monomers. In the above parts by weight data, the 10 to 90 parts by weight of polyvinyl ester includes all of the solids of the polyvinyl ester dispersions such as carboxymethyl cellulose and also the other polymerization aids present as solids in the dispersions or powders produced from the dispersions.

Preferably, the solids content of the adhesive mixes is from 30 to 75% by weight and the dextrin-solid polyvinyl ester weight ratio is between 8:2 to 4:5.

The adhesive mixes are homogeneous and free from coagulates as well as specks which are otherwise formed when dextrins and polyvinyl ester dispersions are mixed together. During storage, phase separation does not occur. The adhesive mixes of the invention are free-flowing and dry to smooth films of high luster. These films are re-wettable and outstanding for their reduced hygroscopicity, i.e. less tendency to block and better adhesion as compared with pure dextrin solutions. The mixes can also be used directly as wet adhesives and when used as such, possess better setting properties. These advantageous properties are especially present also when low-viscosity dextrin components are utilized.

For the preparation of the mixes of the invention all common dextrin types and their mixtures may be used. The dextrins usually have a viscosity of between 20 and 200 cP, measured as a 35% aqueous solution at 25°C. Generally a distinction is made between low-viscosity (20 to 50 cP) dextrins, medium-viscosity (50 to 90 cP) dextrins and high-viscosity (over 100 cP) dextrins. Preferably, the low-viscosity dextrin types are used. Examples of dextrin types are white and gold potato dextrin, corn dextrin and tapioca dextrin.

The adhesive mixes of the invention may also contain plasticizers and moisture-retaining agents, such as dibutyl phthalate, butyl-benzyl phthalate, tributyl citrate, glycerin, ethylene glycol, polyoxyethylene glycols, alkanol or alkylphenol polyoxyethylene glycol ethers; as well as bleaching agents such as alkali metal sulfites or hydrogen peroxide; fungicides and bactericides, for example formaldehyde, sorbic acid, sodium-o-phenyl phenolate, sodium benzoate and 1,2-benzisothiazolone. Also fillers and pigments can be admixed with the remaining ingredients.

The mixes of the invention are suitable as dextrin adhesives with improved properties for gluing paper, cardboard, fibrous materials, wood, for backing and label adhesives and in particular for rewettable or gumming ahdesives. They have a higher drying speed, improved adhesivity, lower hygroscopicity and therefore, for example, they have less tendency to roll and better block stability in gumming applications.

The following examples are illustrative of the invention without being limitative in any respect.

EXAMPLE 1

A coolable and heatable 1-liter glass flask with an agitator, a reflux condenser, a nitrogen inlet tube and a proportionating or dosing means was employed. 18 gm of sodium carboxymethyl cellulose having a purity of 99.5%, a substitution degree of 10 and a viscosity of 25 cP for a 2% aqueous solution, together with 6 gm of nonylphenol polyethlene glycol ether containing on the average 20 mols of ethylene oxide and 1.0 gm of dioctyl sulfosuccinate were dissolved in 270 gm of water in the flask by heating to 70°C while stiring and passing nitrogen therethrough. Then, the temperature was brought to 88°C. 300 gm of vinyl acetate in which 1 gm of tert.-butyl hydroperoxide was dissolved, was proportionated into the flask through one dosing means. A second dosing means proportionated 0.5 gm of sodium formaldehyde sulfoxylate and 0.5 gm of sodium bicarbonate in 50 gm of water. The dosings were carried out at such a rate that the reaction temperature was maintained at 88°C. The dosing of monomer took about 1.5 hours. The dosing of the sodium formaldehyde sulfoxylate solution continued about one-half hour longer. After a postpolymerization time of half an hour, the polymerization mixture was cooled under further stirring. A stable, coagulate-free and speck-free dispersion with a solids content of 50% and a viscosity, measured in the Brookfield Viscosimeter RVT, of 5000 cP at 10 rpm was obtained. The residual monomer content was less than 0.2%. The dispersion dried on a surface to a smooth, lustrous film.

COMPARISION EXAMPLE 1

The procedure as in Example 1 was followed, but with the use of sodium carboxymethyl cellulose of the same viscosity and purity but with a substitution degree of eight. A speck-containing dispersion was obtained having a viscosity of about 4000 cP and 50% solids content, which dried to a rough plastic film.

EXAMPLE 2

In an apparatus as described in Example 1, 9 gm of sodium carboxymethyl cellulose, having a purity of 98.5%, a viscosity of 70 cP and a substitution degree of 14 were dissolved together with 1.5 gm of disodium sulfosuccinic acid ester with the adduct of an alkyl alcohol containing 13 carbon atoms to which are added 15 mols of ethylene oxide, by heating to 70°C in 163 gm of water. Then the temperature was reduced to 25°C, and 30 gm of a monomer mixture, consisting of 300 gm of vinyl acetate, 1 gm of tert.-butyl hydroperoxide and 1 gm of propionaldehyde were added and heated while stirring. As soon as the temperature reached 55°C, a charge consisting of 0.5 gm of sodium formaldehyde sulfoxylate and 0.5 gm of sodium bicarbonate in 40 gm of water was proportionated into the flask at a rate of flow of 15 gm/hour. After the internal temperature reached 68°C, the remaining monomer mixture was proportionated into the flask over 1.5 hours, while the internal temperature was maintained at 70° to 75°C. Polymerization was contained for another one-half hour, followed by cooling. A stable, coagulate-free and speck-free dispersion with a solids content of 60% and a viscosity of 30,000 cP, measured in the Brookfield RVT at 10 rpm, was obtained.

The dispersion formed a satisfactory, lustrous polymer film.

EXAMPLE 3

In an apparatus as described in EXAMPLE 1, 12 gm of sodium carboxymethyl cellulose of a substitution degree of 12 and a viscosity for the 2% aqueous solution of 600 cP, were dissolved together with 1 gm of a sodium alkyl sulfonate containing 11 to 14 carbon atoms in the alkyl in 270 gm of water, by heating to 70°C while passing through nitrogen. After cooling to 30°C, 30 gm of a monomer mixture, consisting of 60 gm of butyl acrylate, 240 gm of vinyl acetate, 1.5 gm of tert. butyl hydroperoxide and 1 gm of propionaldehyde, were added and the reaction mixture was heated. At an internal temperature of 55°C, a charge consisting of 1 gm of sodium formaldehyde sulfoxylate in 50 gm of water was proportionated into the flask. As soon as the reaction temperature had risen to 68°C, the proportionated input of the remaining monomer mixture was started, which mixture was added within 1.5 hours at an internal temperature of 70° to 75°C. After a postpolymerization of half an hour a stable, coagulate-free and speck-free dispersion was obtained with a solids content of 50% and a viscosity of 2000 cP. The residual monomer content was less than 0.2%. A film made from it, is smooth and lustrous.

EXAMPLE 4

The procedure was as in Example 3, but in place of butyl acrylate in the monomer mixture, a corresponding amount (60 gm) of vinyl propionate was employed. Again, a stable, coagulate-free dispersion was obtained.

EXAMPLE 5

In a 100-liter agitator autoclave with a cooling or heating jacket, reflux condenser, temperature measuring means and proportionating means, 900 gm of sodium carboxymethyl with a substitution degree of 12 and a viscosity of 400 cP, 150 gm of sodium alkyl sulfate with 12 carbon atoms in the alkyl were dissolved in 22 liters of water while flushing with nitrogen. Thereafter, 3 kg of vinyl acetate, 8 gm of tert.-butyl hydroperoxide and 8 gm of propionaldehyde were added and the temperature was raised while stirring. At 55°C, a charge of 0.6 liters/hr of a solution of 50 gm of sodium formaldehyde sulfoxylate and 50 gm of sodium bicarbonate in 3 liters of of water was proportionated into the autoclave. When the temperature attained 68°C, a further charge of 10 liters/hr. of a mixture of 27 kg of vinyl acetate, 70 gm of tert.-butyl hydroperoxide and 70 gm of propionaldehyde was proportionated into the autoclave. During the addition, the temperature was maintained at 70° to 75°C. Thereafter, another 20 gm of tert.-butyl hydroperoxide were added, and the mixture was postpolymerized for 1 hour.

A stable, speck-free dispersion was obtained with a residual monomer content of less than 0.2%. The solids content was 55%, the viscosity 8000 cP. The dispersion dried on a surface to a smooth and lustrous film.

COMPARISON EXAMPLE 2

The procedure was as in Example 5, but with the use of a sodium carboxymethyl cellulose of equal viscosity but with a substitution degree of 6. A dispersion was obtained with much speck and coagulate content, which partially settles out and forms rough films.

EXAMPLE 6

The following mixes of dextrin adhesives were produced with the dispersions of Examples 1 to 5 and Comparison Examples 1 and 2.

Mix A. 370 gm of a dispersion were heated to 80°C while stirring, then 225 gm of a low-viscosity, yellow dextrin derived from potatoes (Dextrin 30 AN 45 WA. - Scholten Chemische Fabriken N.V., 35 cP) were added as solid and stirred for 15 minutes at 80°C. Then 20 gm of dibutyl phthalate were added. The product was cooled while stirring and passed through a screen with a mesh opening of 150 $\mu$.

Mix B. 150 gm of a dispersion were mixed with 400 gm of a 60% aqueous solution of Dextrin 30 AN 45 (35 cP at room temperature), 28 gm of glycerin and 3 gm of formaldehyde were added. The adhesive was then passed through a screen of 150 $\mu$ mesh opening.

Mix C. 2 gm of sodium bilsulfite and 2 gm of sodium fluoride in 150 gm of water were mixed with 80 gm of a dispersion. The mixture was heated to 80°C and, while stirring, 360 gm of medium-viscosity corn dextrin (75 cP) in solid form was added. After 15 minutes of additonal heating, the adhesive mixture was cooled and screened as in (A).

Mix D. 150 gm of a dispersion were mixed with 300 gm of a 60% solution of medium-viscosity white potato dextrin (75cP) at room temperature. 15 gm of a polyoxyethylene glycol of molecular weight of 600 was added. Thereafter, the adhesive mixture was screened as in (A).

Mix E. 200 gm of a dispersion were heated to 80°C while stirring, and then 100 gm of a low-viscosity potato dextrin (25 cP) in solid form and 3 gm of $H_2O_2$ were added. The temperature of 80°C was maintained for 20 minutes. Thereafter, the adhesive mixture was cooled and screened as in (A).

The mixtures were tested immediately for the screen residue. After standing for eight weeks, the separation phenomena was determined as the percent of the phase separation (see Table 1).

TABLE I

| Mixture | | 1 | (Comparison 1) | 2 | 3 | 4 | 5 | (Comparison 2) |
|---|---|---|---|---|---|---|---|---|
| A | Screen residue | 0 | 40 gm | 0.01 gm | 0.03 gm | 0.01 gm | 0.01 gm | Coagulated |
|   | Separation | homogeneous | 10% | homogeneous | homogeneous | homogeneous | homogeneous | — |
| B | Screen residue | 0 | 15 gm | 0.01 gm | 0 | 0.01 gm | 0 | 40 gm |
|   | Separation | homogeneous | 15% | homogeneous | homogeneous | homogeneous | homogeneous | 40% |
| C | Screen residue | 0 | 15 gm | 0 | 0 | 0 | 0 | 35 gm |
|   | Separation | homogeneous | 30% | homogeneous | homogeneous | homogeneous | homogeneous | 20% |
| D | Screen residue | 0 | 20 gm | 0 | 0 | 0 | 0 | 35 gm |
|   | Separation | homogeneous | 20% | homogeneous | homogeneous | homogeneous | homogeneous | 30% |
| E | Screen residue | 0 | 50 gm | 0.1 gm | 0.04 gm | 0.02 gm | 0 | Coagulated |
|   | Separation | homogeneous | 20% | homogeneous | homogeneous | homogeneous | homogeneous | — |

The preceding specific embodiments are illustrative of the practice of the invention. It is to be understood, however, that other expedients known to those skilled in the art, or disclosed herein, may be employed without departing from the spirit of the invention or the scope of the appended claims.

We claim:

1. A stable aqueous dextrin-polyvinyl ester adhesive mix containing from 20% to 80% of a solids content consisting essentially of
   a. from 10 to 90 parts by weight of dextrin, and
   b. from 10 to 90 parts by weight of polyvinyl esters produced by emulsion polymerization of a monomer charge of vinyl esters of alkanoic acids having from 1 to 18 carbon atoms and up to 40% by weight of said monomer charge, of oil-soluble, mono-olefinically-unsaturated monomers copolymerizable with said vinyl esters utilizing water-soluble free-radical-forming polymerization catalysts in the presence of from 1% to 10% by weight, based on the weight of said monomer charge of carboxymethyl celluloses having a substitution degree of at least 10, and from 20% to 80% by weight of water.

2. The dextrin-polyvinyl ester adhesive mix of claim 1 wherein said dextrin has a viscosity (35% aqueous solution at 25°C) of from 20 to 200 cP.

3. The dextrin-polyvinyl ester adhesive mix of claim 1 wherein said dextrin has a viscosity (35% aqueous solution at 25°C) of from 20 to 50 cP.

4. The dextrin-polyvinyl ester adhesive mix of claim 1 wherein the solids content is from 30% to 75% by weight and the weight ratio of dextrin to solid polyvinyl ester is between 8:2 to 4:5.

5. The stable aqueous dextrin-polyvinyl ester adhesive mix of claim 1 wherein said monomer charge includes additionally from 0.1 to 5% by weight, based on the weight of the monomer charge, of monomers selected from the group consisting of water-soluble mono-olefinically-unsaturated monomers copolymerizable with vinyl esters and poly-olefinically-unsaturated monomers copolymerizable with vinyl esters.

6. The stable aqueous dextrin-polyvinyl ester adhesive mix of claim 1 wherein said carboxymethyl celluloses have a substitution degree of from 10 to 20 and a degree of polymerization of from 100 to 10,000.

7. The stable aqueous dextrin-polyvinyl ester adhesive mix of claim 1 wherein from 2 to 6% by weight, based on the weight of said monomer charge, of carboxymethyl celluloses having a substitution degree of between 12 and 18 are employed as said protective colloid.

* * * * *